United States Patent
Keller et al.

(10) Patent No.: US 6,297,298 B1
(45) Date of Patent: Oct. 2, 2001

(54) PHTHALONITRILE PREPOLYMERIZATION COMPOSITION

(75) Inventors: Teddy M. Keller, Fairfax Station, VA (US); Satya B. Sastri, Greenbelt, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/007,826

(22) Filed: Jan. 15, 1998

(51) Int. Cl.[7] ............................. C08L 53/02; C08G 3/28; C07C 255/33
(52) U.S. Cl. ......................... 524/81; 524/86; 524/174; 524/186; 524/401; 558/420; 558/421; 522/6
(58) Field of Search ................... 522/6; 428/98, 428/221; 558/421

(56) References Cited

U.S. PATENT DOCUMENTS

| | | | |
|---|---|---|---|
| 4,408,035 | 10/1983 | Keller | 528/183 |
| 4,587,325 | 5/1986 | Keller | 528/172 |
| 5,003,039 | 3/1991 | Keller | 528/362 |
| 5,003,078 | 3/1991 | Keller | 548/406 |
| 5,004,801 | 4/1991 | Keller et al. | 528/360 |
| 5,132,396 | 7/1992 | Keller | 528/353 |
| 5,159,054 | 10/1992 | Keller | 528/170 |
| 5,202,414 | 4/1993 | Keller | 528/481 |
| 5,237,045 | 8/1993 | Burchill et al. | 528/362 |
| 5,247,060 | 9/1993 | Keller | 528/362 |
| 5,262,514 | 11/1993 | Keller | 528/322 |
| 5,292,854 | 3/1994 | Keller | 528/170 |
| 5,350,828 | 9/1994 | Keller et al. | 528/183 |
| 5,464,926 | 11/1995 | Keller | 528/206 |

OTHER PUBLICATIONS

Keller, T.M. and Price, T.R., "Amine–Cured Bisphenol–Linked Phthalonitrile Resins", J. Macromol. Sci.–Chem., A18(6), pp. 931–937 (1982).

*Primary Examiner*—Johann Richter
*Assistant Examiner*—Ebenezer Sackey
(74) *Attorney, Agent, or Firm*—Thomas E. McDonnell; Ralph T. Webb

(57) ABSTRACT

A polymerizable composition suitable for storage prior to polymerization is made by mixing a phthalonitrile monomer and a curing agent under non-reactive conditions below the melting temperatures of the phthalonitrile monomer and the curing agent and in the absence of a solvent to create a homogeneous, unreacted mixture.

13 Claims, No Drawings

PHTHALONITRILE PREPOLYMERIZATION COMPOSITION

BACKGROUND OF THE INVENTION

1. Field of the Invention

The invention relates to polymerizable phthalonitrile compositions, and in particular to storable mixtures of phthalonitrile monomers and curing agents.

2 Description of the Related Art

Phthalonitrile polymers of various types are described generally in U.S. Pat. No. 3,730,946, U.S. Pat. No. 3,763,210, U.S. Pat. No. 3,787,475, U.S. Pat. No. 3,869,499, U.S. Pat. No. 3,972,902, U.S. Pat. No. 4,209,458, U.S. Pat. No. 4,223,123, U.S. Pat. No. 4,226,801, U.S. Pat. No. 4,234,712, U.S. Pat. No. 4,238,601, U.S. Pat. No. 4,259,471, U.S. Pat. No. 4,304,896, U.S. Pat. No. 4,307,035, U.S. Pat. No. 4,315,093, U.S. Pat. No. 4,351,776, U.S. Pat. No. 4,408,035, U.S. Pat. No. 4,409,382, U.S. Pat. No. 4,410,676, U.S. Pat. No. 5,003,039, U.S. Pat. No. 5,003,078, U.S. Pat. No. 5,004,801, U.S. Pat. No. 5,132,396, U.S. Pat. No. 5,159,054, U.S. Pat. No. 5,202,414, U.S. Pat. No. 5,208,318, U.S. Pat. No. 5,237,045, U.S. Pat. No. 5,242,755, U.S. Pat. No. 5,247,060, U.S. Pat. No. 5,292,854, U.S. Pat. No. 5,304,625, U.S. Pat. No. 5,350,828, U.S. Pat. No. 5,352,760, U.S. Pat. No. 5,389,441, U.S. Pat. No. 5,464,926, U.S. patent application by Satya B. Sastri and Teddy M. Keller for "FIBER-REINFORCED PHTHALONITRILE COMPOSITE CURED WITH LOW-REACTIVITY AROMATIC AMINE CURING AGENT" filed Oct. 2, 1997 and U.S. patent application by Satya B. Sastri and Teddy M. Keller for "PHTHALONITRILE THERMOSET POLYMERS AND COMPOSITES CURED WITH HALOGEN-CONTAINING AROMATIC AMINE CURING AGENTS" filed Oct. 2, 1997. All of these patents and applications are incorporated herein by reference.

The above references teach an in situ method of polymerization wherein a phthalonitrile monomer is heated to a temperature above the melting point of the monomer and a curing agent is added to the melt stage to promote polymerization of the phthalonitrile monomer. A method wherein the curing agent is added immediately before the heating step has also been described. These methods of polymerization can be inconvenient in some circumstances, particularly in the fabrication of composites by methods such as resin transfer molding (RTM), filament winding, injection molding, or prepreg formulation, where it may be difficult or cumbersome to mix the monomer and the curing agent on site or to add the curing agent to the melt after the heating step is begun. Alternatively, many of the above references teach that a frangible B-stage polymer can be created by heating the phthalonitrile monomer with a curing agent to initiate the polymerization process and then quenching the reaction before the polymerization goes to completion. The B-stage polymer created by this process can be stored indefinitely at room temperature. However, creation of a B-stage prepolymer involves the additional time-consuming and cost-consuming step of partial polymerization of the monomer.

In conventional resin systems such as epoxies, polyimides, vinyl esters, cyanate esters, etc., a mixture of a monomer and a curing agent must be used fairly soon after the mixture is created because the monomer begins to immediately polymerize in the presence of the curing agent. Even under freezer conditions, the mixture has a short shelf life. As the material polymerizes, it becomes highly viscous and unprocessable. Thus, long term storage of a mixture of the monomer and a curing agent in these conventional resin systems is not possible.

SUMMARY OF THE INVENTION

It has now been discovered that phthalonitrile monomers can be combined with curing agents below the melting temperatures of the monomer and curing agent without polymerization taking place, and that the mixture can be maintained in an unreacted state for an indefinite period of time.

Accordingly, the present invention is directed to a polymerizable composition suitable for storage prior to polymerization, made by a process comprising the steps of mixing a phthalonitrile monomer and a curing agent under non-reactive conditions below the melting temperatures of the phthalonitrile monomer and the curing agent and in the absence of a solvent to create a homogeneous, unreacted mixture. The invention further relates to an article comprising a dry, homogeneous, unreacted mixture of a phthalonitrile monomer and a curing agent in a storage container. The invention further relates to a stored polymerizable composition made by a process comprising the steps of mixing a phthalonitrile monomer and a curing agent under non-reactive conditions in the absence of a solvent to create a homogeneous, unreacted mixture and storing the unreacted mixture under non-reactive conditions. The invention further relates to a method of making a phthalonitrile polymer comprising the steps of mixing a phthalonitrile monomer and a curing agent at a first location under non-reactive conditions to create a homogeneous, unreacted mixture, transporting the mixture to a second location remote from the first location, and polymerizing the phthalonitrile monomer by heating the mixture at the second location to a temperature above the melting point of the mixture.

By creating a prepolymer mixture for long-term storage according to the present invention, the extra step of creating a B-stage prepolymer as described in the above-cited references is avoided.

DETAILED DESCRIPTION OF THE PREFERRED EMBODIMENT

The present invention relates to a polymerizable composition suitable for storage prior to polymerization, made by a process comprising the step of mixing a phthalonitrile monomer and a curing agent under non-reactive conditions to create a homogeneous, unreacted mixture. The phthalonitrile monomer may be any phthalonitrile monomer described in the above referenced patents. Preferably, the phthalonitrile monomer is a compound of the formula:

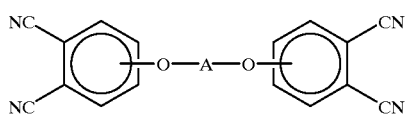

wherein A is any divalent organic radical. More preferably, A is selected from the group consisting of substituted or unsubstituted phenyl radicals, polyphenyl radicals, polyphenoxy radicals, fused aromatic poly-ring radicals and radicals of the general form —Ar—Z—Ar— where Ar is a substituted or unsubstituted aromatic group and Z is

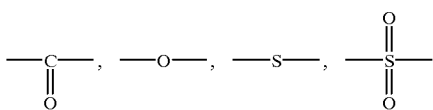

any alkylene of up to six carbon atoms, any halogenated alkylene of up to six carbon atoms, an imide-containing group or a connecting bond. By the word "substituted", it is meant that any known substituent could be attached to the aromatic moiety. Substituents include but are not limited to halogens, chalcogens, and organic radicals such as phenyl, alcohol, carboxyl, carbonyl, or aliphatic groups of less than 10 carbon atoms. Phthalonitrile monomers of the above description are dry solids, typically powders, below their melting temperature.

The curing agent may be any curing agent useful in promoting the polymerization of the phthalonitrile monomer under reactive conditions, such as temperatures above the melting point of the monomer. The curing agent should be a dry solid, for example, a powder, and should be stable and nonvolatile under storage conditions, during the heat up to the polymerization temperature and during polymerization of the monomer. Preferably, the curing agent is selected from the group of curing agents consisting of aromatic amines, phenols, inorganic acids, strong organic acids, metals, metallic salts and combinations thereof. Most preferably, the curing agent is an aromatic amine.

According to the invention, the phthalonitrile monomer and the curing agent are mixed and stored under non-reactive conditions, that is, under conditions wherein the phthalonitrile monomer and the curing agent do not react and the phthalonitrile monomer does not polymerize. Generally, this will be at a temperature below the melting temperatures of the phthalonitrile monomer and the curing agent. Preferably, the monomer and the curing agent are mixed and stored at room temperature or at the ambient temperature depending on the location. For an additional precaution against reactivity, the monomer and the curing agent may be mixed and stored in an inert atmosphere. The monomer and the curing agent may be mixed by any method known in the art for creating a dry, homogeneous mixture in the absence of a solvent.

The phthalonitrile monomer and the curing agent are mixed thoroughly to create a homogeneous, unreacted mixture. By the term "homogeneous" as used herein, it is meant that both the phthalonitrile monomer and the curing agent are distributed evenly throughout the mixture. The mixture may thus be made in bulk quantities from which smaller portions can be subdivided. The mixture may be stored in any suitable storage container.

With the present invention, it is not necessary to polymerize the mixture at the same location that the mixing is carried out. The homogeneous, unreacted mixture may be created in one location and then may be put into a storage container and transported to a second location for use. At the second location, the phthalonitrile monomer is polymerized by heating the homogeneous, unreacted mixture to a temperature above the melting point of the mixture. If, at the second location, it is desirable to change the ratio of phthalonitrile monomer to curing agent prior to polymerization, for example to speed up or slow down the polymerization for a particular practical application, this can be done by adding and thoroughly mixing an additional amount of the monomer or curing agent to achieve the desired monomer-curing agent ratio.

Having described the invention, the following examples are given to illustrate specific applications of the invention, including the best mode now known to perform the invention. These specific examples are not intended to limit the scope of the invention described in this application.

EXAMPLES

Example 1

Formation of prepolymerization composition from 4,4'-bis (3,4-dicyanophenoxy) biphenyl monomer and an amine catalyst, 1,3-bis(3-aminophenoxy)benzene (m-APB) and cure to a thermoset 4,4'-Bis(3,4-dicyanophenoxy) biphenyl monomer (1.5 g, 3.4 mmoles) and m-APB (0.026 g, 0.087 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 3 hours at 255° C. and a vitrified product resulted after about 12 hours at 255° C.

Example 2

Formation of prepolymerization composition from 4,4'-bis (3,4-dicyanophenoxy) biphenyl monomer and 1,3-bis(3-aminophenoxy)benzene (m-APB) and cure to a thermoset 4,4'-Bis(3,4-dicyanophenoxy) biphenyl monomer (1.5 g, 3.4 mmoles) and m-APB (0.051 g, 0.17 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. A vitrified product was obtained after 1 hour at 255° C.

Example 3

Formation of prepolymerization composition from 4,4'-bis (3,4-dicyanophenoxy) biphenyl monomer and bis[4-(4-aminophenoxy)phenyl]sulfone (p-BAPS) and cure to a thermoset 4,4'-Bis(3,4-dicyanophenoxy) biphenyl monomer (1.5 g, 3.4 mmoles) and p-BAPS (0.038 g, 0.087 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 6 hours at 255° C. and a vitrified product resulted after about 18 hours at 255° C.

Example 4

Formation of prepolymerization composition from 4,4'-bis (3,4-dicyanophenoxy) biphenyl monomer and bis[4-(4-aminophenoxy)phenyl]sulfone (p-BAPS) and cure to a thermoset 4,4'-Bis(3,4-dicyanophenoxy) biphenyl monomer (1.5 g, 3.4 mmoles) and p-BAPS (0.076 g, 0.17 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 30 minutes at 255° C. and a vitrified product resulted after 1.5 hours at 255° C.

Example 5
Formation of prepolymerization composition from 4,4'-bis (3,4-dicyanophenoxy) biphenyl monomer and a phenolic catalyst, 4,4'-biphenol and cure to a thermoset 4,4'-Bis(3,4-dicyanophenoxy) biphenyl monomer (1.5 g, 3.4 mmoles) and 4,4'-biphenol (0.186 g, 1.0 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 2 hours at 255° C. and a vitrified product resulted after about 4 hours at 255° C.

Example 6
Formation of prepolymerization composition from 4,4'-bis (3,4-dicyanophenoxy) biphenyl monomer and 4,4'-biphenol and cure to a thermoset 4,4'-Bis(3,4-dicyanophenoxy) biphenyl monomer (1.5 g, 3.4 mmoles) and 4,4'-biphenol (0.744 g, 4.0 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. A vitrified product was obtained after 45 minutes at 255° C.

Example 7
Formation of prepolymerization composition from 4,4'-bis (3,4-dicyanophenoxy) biphenyl monomer and an organic acid catalyst, p-toluenesulfonic acid and cure to a thermoset 4,4'-Bis(3,4-dicyanophenoxy) biphenyl monomer (1.5 g, 3.4 mmoles) and p-toluenesulfonic acid monohydrate (0.03 g, 0.15 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 3 hours at 255° C. and a vitrified product resulted after 8 hours at 255° C.

Example 8
Formation of prepolymerization composition from 4,4'-bis (3,4-dicyanophenoxy) biphenyl monomer and p-toluenesulfonic acid and cure to a thermoset 4,4'-Bis(3,4-dicyanophenoxy) biphenyl monomer (1.5 g, 3.4 mmoles) and p-toluenesulfonic acid monohydrate (0.12 g, 0.6 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 1 hour at 255° C. and a vitrified product resulted after 5 hours at 255° C.

Example 9
Formation of prepolymerization composition from 4,4'-bis (3,4-dicyanophenoxy) biphenyl monomer and a metallic salt, stannous chloride and cure to a thermoset 4,4'-Bis(3,4-dicyanophenoxy) biphenyl monomer (1.5 g, 3.4 mmoles) and stannous chloride dihydrate (0.034 g, 0.15 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 2 hours at 255° C. and a vitrified product resulted after 6 hours at 255° C.

Example 10
Formation of prepolymerization composition from 4,4'-bis (3,4-dicyanophenoxy) biphenyl monomer and a metallic salt, stannous chloride and cure to a thermoset 4,4'-Bis(3,4-dicyanophenoxy) biphenyl monomer (1.5 g, 3.4 mmoles) and stannous chloride dihydrate (0.135 g, 0.6 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 1 hour at 255° C. and a vitrified product resulted after 3.5 hours at 255° C.

Example 11
Formation of prepolymer composition from 2,2-bis[4-(3,4-dicyanophenoxy)phenyl]propane and 1,4-bis(4-aminophenoxy)benzene (p-APB)

2,2-Bis[4-(3,4-dicyanophenoxy)phenyl]propane monomer (1.5 g, 3.108 mmoles) and p-APB (0.034 g, 0.12 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 2 hours and had vitrified after about 4 hours at 255° C.

Example 12
Formation of prepolymer composition from 2,2-bis[4-(3,4-dicyanophenoxy)phenyl]hexafluoropropane and 1,4-bis(4-aminophenoxy)benzene (p-APB)

2,2-Bis[4-(3,4-dicyanophenoxy)phenyl] hexafluoropropane monomer (1.5 g, 2.540 mmoles) and p-APB (0.028 g, 0.095 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 2 hours and had vitrified after about 4 hours at 255° C.

Example 13
Formation of prepolymer composition from 2,2-bis[4-(3,4-dicyanophenoxy)phenyl]propane and 4,4'-diaminodiphenyl sulfone (p-DDS)

2,2-Bis[4-(3,4-dicyanophenoxy)phenyl]propane monomer (1.5 g, 3.108 mmoles) and p-DDS (0.029 g, 0.117 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 4 hours and had vitrified after about 9 hours at 255° C.

Example 14
Formation of prepolymer composition from 2,2-bis[4-(3,4-dicyanophenoxy)phenyl]hexafluoropropane and 4,4'-diaminodiphenyl sulfone (p-DDS)

2,2-Bis[4-(3,4-dicyanophenoxy)phenyl] hexafluoropropane monomer (1.5 g, 2.540 mmoles) and p-DDS (0.024 g, 0.095 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 1 hour and had vitrified after about 2.5 hours at 255° C.

Example 15
Formation of prepolymer composition from 2,2-bis[4-(3,4-dicyanophenoxy)phenyl]propane and 4",4'"-(hexafluoroisopropylidene)bis(4-phenoxyaniline)(FA)

2,2-Bis[4-(3,4-dicyanophenoxy)phenyl]propane monomer (1.5 g, 3.108 mmoles) and FA (0.061 g, 0.117 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 4 hours and had vitrified after about 10 hours at 255° C.

Example 16
Formation of prepolymer composition from 2,2-bis[4-(3,4-dicyanophenoxy)phenyl]hexafluoropropane and 4",4'"-(hexafluoroisopropylidene)bis(4-phenoxyaniline)(FA)

2,2-Bis[4-(3,4-dicyanophenoxy)phenyl] hexafluoropropane monomer (1.5 g, 2.540 mmoles) and FA (0.05 g, 0.095 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 1 hour and had vitrified after about 2 hours at 255° C.

Example 17
Formation of prepolymer composition from bis[4-(3,4-dicyanophenoxy)phenyl]sulfone and 4,4'-diaminobenzophenone Bis[4-(3,4-dicyanophenoxy)phenyl]sulfone monomer (1.5 g, 2.974 mmoles) and 4,4'-diaminobenzophenone (2.0 wt. %, 0.142 mmole) thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 3 hours and had vitrified after about 12 hours at 255° C.

Example 18
Formation of prepolymerization composition from imide-containing phthalonitrile monomer and an amine catalyst, 1,3-bis(3-aminophenoxy)benzene (m-APB) and cure to a thermoset An imide-containing monomer (1.5 g, 2.45 mmoles, synthesized from 3,3',4,4'-benzophenone tetracarboxylic dianhydride and 4-(3-aminophenoxy)phthalonitrile), and m-APB (0.214 g, 0.073 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 2 hours at 255° C. and a vitrified product resulted after about 6 hours at 255° C.

Example 19
Formation of prepolymer composition from an oligomeric aromatic ether-containing phthalonitrile monomer and bis[4-(4-aminophenoxy)phenyl]sulfone (p-BAPS)

1.5 g of an oligomeric multiple aromatic ether-containing phthalonitrile monomer prepared from 4,4'-difluorobenzophenone (12.01 g, 551.5 mmoles), 4,4'-dihydroxybiphenyl (20.11 g, 108.1 mmoles) and 4-nitrophthalonitrile (19.0 g, 109.8 mmoles) and 2% wt. bis[4-(4-aminophenoxy)phenyl]sulfone (0.069 mmole) were thoroughly mixed at room temperature to obtain a homogeneous mixture. Upon heating of the mixture above the melt temperature, the mixture will cure to a thermoset. A sample of the mixture was placed on a hot plate at 255° C. to melt and maintain the mixture in the melt phase with periodic stirring to monitor the increase in viscosity and the time to gelation. The melt was very viscous after 6 hours and had vitrified after about 12 hours at 255° C.

Example 20
Thermal stability of cured phthalonitrile resins

The thermal stability of the cured phthalonitrile polymers from Example 1–11 were evaluated by thermogravimetric analysis (TGA) on powdered samples under an inert atmosphere of nitrogen. Results indicate that in all cases, samples are stable up to about 400° C. and begin to lose weight thereafter. When the powdered samples are postcured to elevated temperatures of 8 hours at 350° C. and 8 hours at 375° C. in the TGA furnace, all samples show improved thermal stability with weight loss occurring only above 480–500° C. The samples also retain about 60–65% char upon pyrolysis to 1000° C. under inert conditions. In an oxidative environment, samples cured to 255° C. show rapid weight loss above 400° C., typical of most carbon-based materials. Samples that are postcured to elevated temperatures of 8 h at 350° C. and 8 hours at 375° C. in the TGA furnace show better thermo-oxidative stability than the 255° C. cured resins and are stable to 500° C.

Obviously, many modifications and variations of the present invention are possible in light of the above teachings. It is therefore to be understood that, within the scope of the appended claims, the invention may be practiced otherwise than as specifically described.

What is claimed is:

1. A method of storing a phthalonitrile polymer comprising the steps of
   mixing a phthalonitrile monomer and a curing agent at a first location under non-reactive conditions at ambient temperature and in the absence of a solvent to create a homogeneous, unreacted mixture.

2. The method of claim 1 including the additional step of adding to the mixture an additional amount of the phthalonitrile monomer or the curing agent to change the ratio of phthalonitrile monomer to curing agent after the step of transporting the mixture to a second location and before the step of polymerizing the phthalonitrile monomer.

3. A method of storing a phthalonitrile polymerizable composition for storage comprising the steps of mixing a phthalonitrile monomer and a curing agent under non-reactive conditions at ambient temperature and in the absence of a solvent to create a homogeneous, unreacted mixture, and placing the homogeneous, unreacted mixture in a storage container.

4. The method of claim 1 wherein the composition is mixed under an inert atmosphere.

5. The method of claim 1 wherein the phthalonitrile monomer is a compound of the formula:

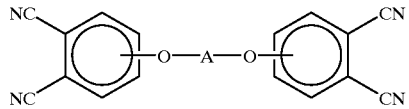

wherein A is a divalent organic radical.

6. The method of claim 5 wherein A is selected from the group consisting of substituted or unsubstituted phenyl radicals, polyphenyl radicals, polyphenoxy radicals, fused aromatic poly-ring radicals and radicals of the general form —Ar—Z—Ar— where Ar is a substituted or unsubstituted aromatic group and Z is

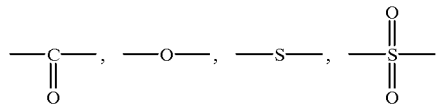

an alkylene of up to six carbon atoms, a halogenated alkylene of up to six carbon atoms, an imide-containing group or a connecting bond.

7. The method of claim 1 wherein the curing agent is selected from the group of curing agents consisting of aromatic amines, phenols, inorganic acids, strong organic acids, metals, metallic salts and combinations thereof.

8. The method of claim 1 wherein the curing agent is an aromatic amine.

9. The method of claim 3 wherein the composition is mixed under an inert atmosphere.

10. The method of claim 3 wherein the phthalonitrile monomer is a compound of the formula:

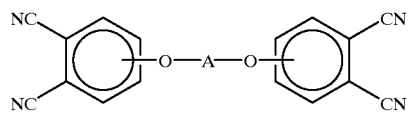

wherein A is a divalent organic radical.

11. The method of claim 10 wherein A is selected from the group consisting of substituted or unsubstituted phenyl radicals, polyphenyl radicals, polyphenoxy radicals, fused aromatic poly-ring radicals and radicals of the general form —Ar—Z—Ar— where Ar is a substituted or unsubstituted aromatic group and Z is

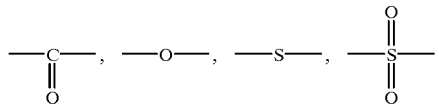

an alkylene of up to six carbon atoms, a halogenated alkylene of up to six carbon atoms, an imide-containing group or a connecting bond.

12. The method of claim 3 wherein the curing agent is selected from the group of curing agents consisting of aromatic amines, phenols, inorganic acids, strong organic acids, metals, metallic salts and combinations thereof.

13. The method of claim 3 wherein the curing agent is an aromatic amine.

* * * * *